Oct. 25, 1966  N. T. GENERAL  3,280,656
TRANSMISSION

Filed May 7, 1963 4 Sheets-Sheet 1

NORMAN T. GENERAL
INVENTOR.

BY John R. Faulkner
Robert E. McCollum
ATTORNEYS

Oct. 25, 1966  N. T. GENERAL  3,280,656
TRANSMISSION

Filed May 7, 1963  4 Sheets-Sheet 2

NORMAN T. GENERAL
INVENTOR.

BY John R. Faulkner
Robert E. McCollum
ATTORNEYS

INVENTOR.
NORMAN T. GENERAL
BY John R. Faulkner
Robert E. McCollum
ATTORNEYS

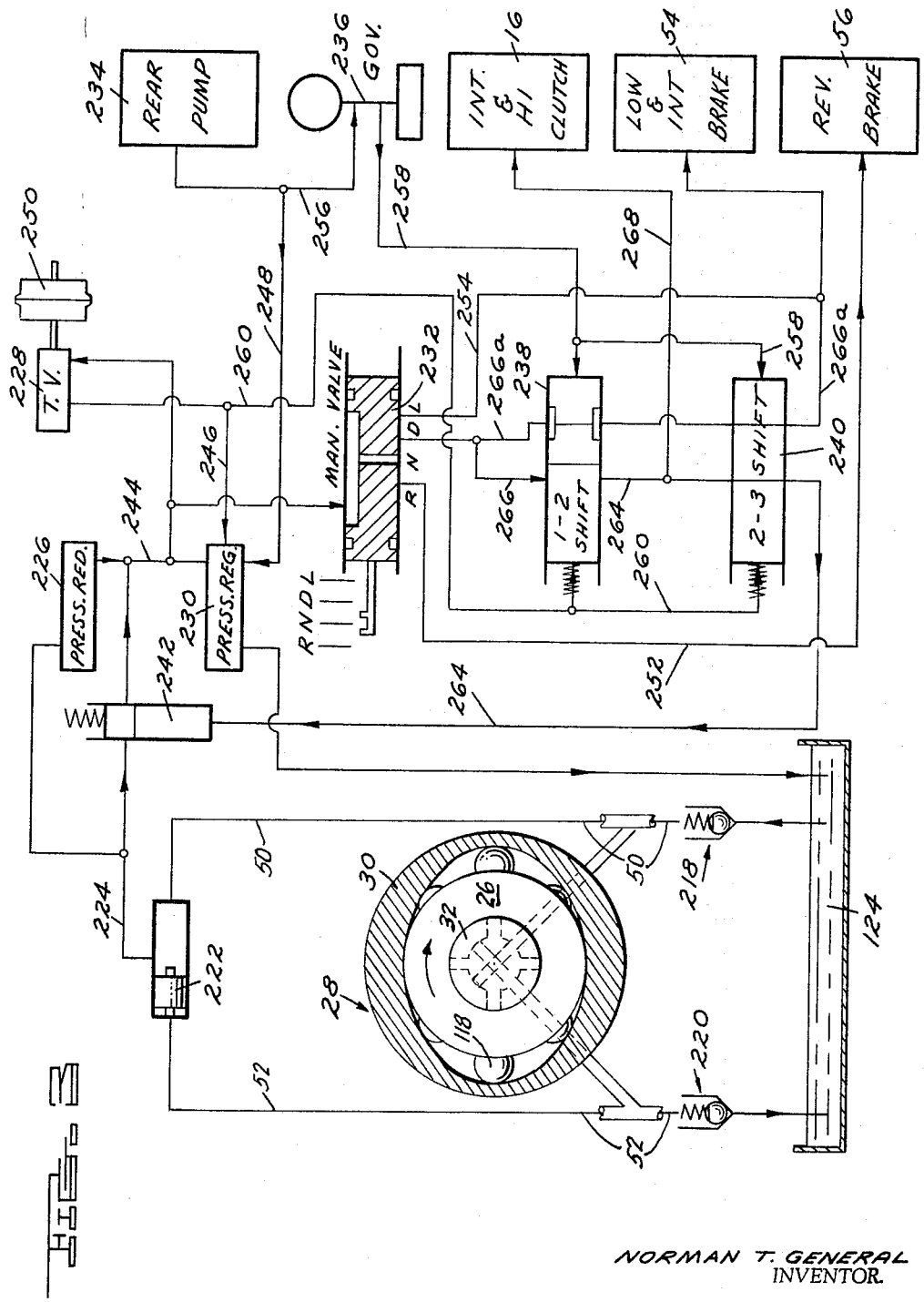

United States Patent Office 3,280,656
Patented Oct. 25, 1966

3,280,656
TRANSMISSION
Norman T. General, Orchard Lake, Mich., assignor to Ford Motor Company, Dearborn, Mich., a corporation of Delaware
Filed May 7, 1963, Ser. No. 278,567
14 Claims. (Cl. 74—687)

This invention relates to a transmission, and one preferably for use in a motor vehicle. More particularly, it relates to an automatic transmission of the planetary gear type controlled by the selective operation of a hydraulic pump to provide a plurality of forward driving speed ratios, a reverse drive, and engine or hill braking.

Automatic transmissions in use today generally provide a plurality of forward and reverse drive ranges substantially automatically by combining a fluid coupling or fluid torque converter with planetary gearing. The gearing is controlled by selectively engageable clutches and brakes actuated by fluid from a fluid pressure control system. Thus, speed ratio changes are made without the necessity of a manually operable clutch between the engine and transmission.

Such an arrangement generally requires the inclusion of an engine driven fluid pump to supply the necessary fluid under pressure to actuate the individual clutch and brake friction devices. The control system may also include a transmission output shaft driven fluid pump so as to provide a fluid signal pressure that changes as a function of vehicle speed. The use of a main engine driven pump not only decreases the power available to drive the output shaft, but also adds to the initial manufacturing cost.

The invention provides an automatic transmission construction having a plurality of different drive ranges with automatic changes therebetween obtained without the use of an auxiliary engine driven hydraulic pump, or the inclusion of a fluid torque converter or coupling to permit start-up of the vehicle and initial torque multiplication. The invention accomplishes this by providing a transmission consisting of planetary gearing connected independently or collectively to a power input shaft by means of a hydraulic pump adapted to operate either as a pump or as a clutch, or as both. The pump not only selectively distributes the torque from the power input shaft to the different gearing elements, but also simultaneously provides a control pressure for actuation of the friction devices establishing the different drives through the gearing.

The transmission constructed according to the invention consists of two sets of planetary gearing individually or collectively connected to a power input shaft by a hydrostatic type fluid pump, the pump having a fluid discharge that can be fully blocked, partially blocked, or completely opened to establish different drive connections. Substantially complete blockage of the pump discharge passage locks up the pump elements for unitary rotation to drive a gear input element at engine speed. Completely opening the pump outlet conditions the transmission for a neutral operation, while partial blocking of the discharge port provides a low level control pressure to effect actuation of the friction devices controlling the planetary gearing without transmitting a drive to the gearset input member.

One of the objects of the invention, therefore, is to provide an automatic transmission that is simple in construction, is usable over wide torque ranges, and provides its own source of control pressure during operation without the use of an auxiliary engine driven fluid supply source.

Another object of the invention is to provide an automatic transmission construction providing a plurality of different reduction drive power paths and a split torque direct drive power path, with automatic changes therebetween being accomplished without the use of fluid couplings or fluid torque converters or a manually operated clutch between the engine and transmission.

A further object of the invention is to provide an automatic transmission construction consisting of a number of planetary gearsets conditioned for reduction drive or direct drive by the selective control of a hydraulic pumping device selectively distributing the power input shaft torque to the gearsets.

A still further object of the invention is to provide a transmission construction consisting of two planetary gearsets connected to a power input shaft through a hydrostatic pump operable alternatively as a pump or a clutch to provide a plurality of reduction drives through the transmission; or, operable as a clutch to connect both gearsets to the engine input shaft to provide a direct drive through the transmission; the pump simultaneously providing the control pressure for actuating the friction devices necessary to establish the respective drives.

It is also an object of the invention to provide a three-speed automatic transmission having two forward reduction drives, a direct drive, a reverse drive, and engine or hill braking.

A further object of the invention is to provide a three-speed automatic transmission construction permitting an automatic pick-up shift between a reduction drive and a direct drive, and vice versa, without the engagement or disengagement of fluid pressure actuated friction devices.

Other objects, features, and advantages of the invention will become apparent upon reference to the succeeding detailed description thereof, and to the drawings illustrating the preferred embodiments thereof; wherein, FIGURES 1 and 1a are separate cross-sectional views of different portions of a transmission embodying the invention;

FIGURE 2 is a schematic illustration of the transmission shown in FIGURES 1 and 1a;

FIGURE 3 is a schematic illustration in block form of a control system for the transmission of FIGURES 1 and 1a; and, FIGURE 4 is a schematic diagram of a modification of the transmission shown in FIGURE 2.

Figure 2:
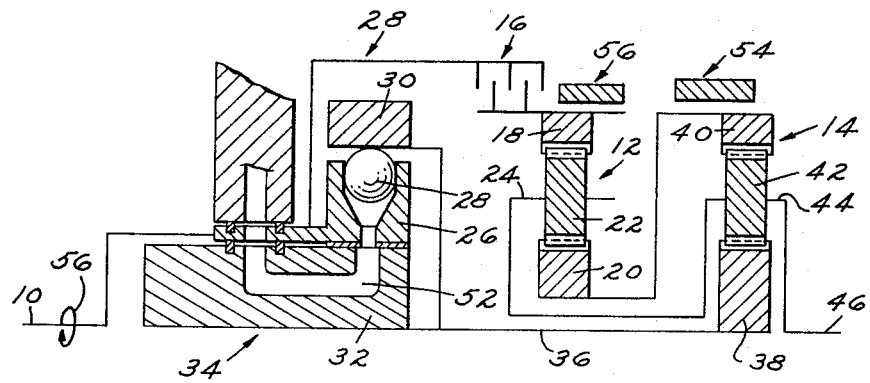

In general, as best seen in FIGURE 2, the transmission has a power input shaft 10, from which the torque is divided to two planetary gearsets 12 and 14. The input shaft is connected in one path through a selectively engageable friction type clutch 16 to the ring gear 18 of gearset 12, having a sun gear 20 and planet pinions 22 supported on a carrier 24. The input shaft is also drive connected to the cylinder block 26 of a hydrostatic ball piston type pump 28. The pump has ball piston members 29 cooperating with an eccentrically mounted stroking ring or cam 30 interconnected to a pintle 32 to constitute a stroking assembly 34. The pintle is in turn drive connected by an intermediate shaft 36 to the sun gear 38 of gearset 14. This gearset, like gearset 12, has a ring gear 40 and planet pinions 42 supported upon an output carrier 44. The sun and ring gears 20 and 40 are interconnected, as shown, as are the carriers 24 and 44, which are also fixed to a power output shaft 46.

Figure 1:
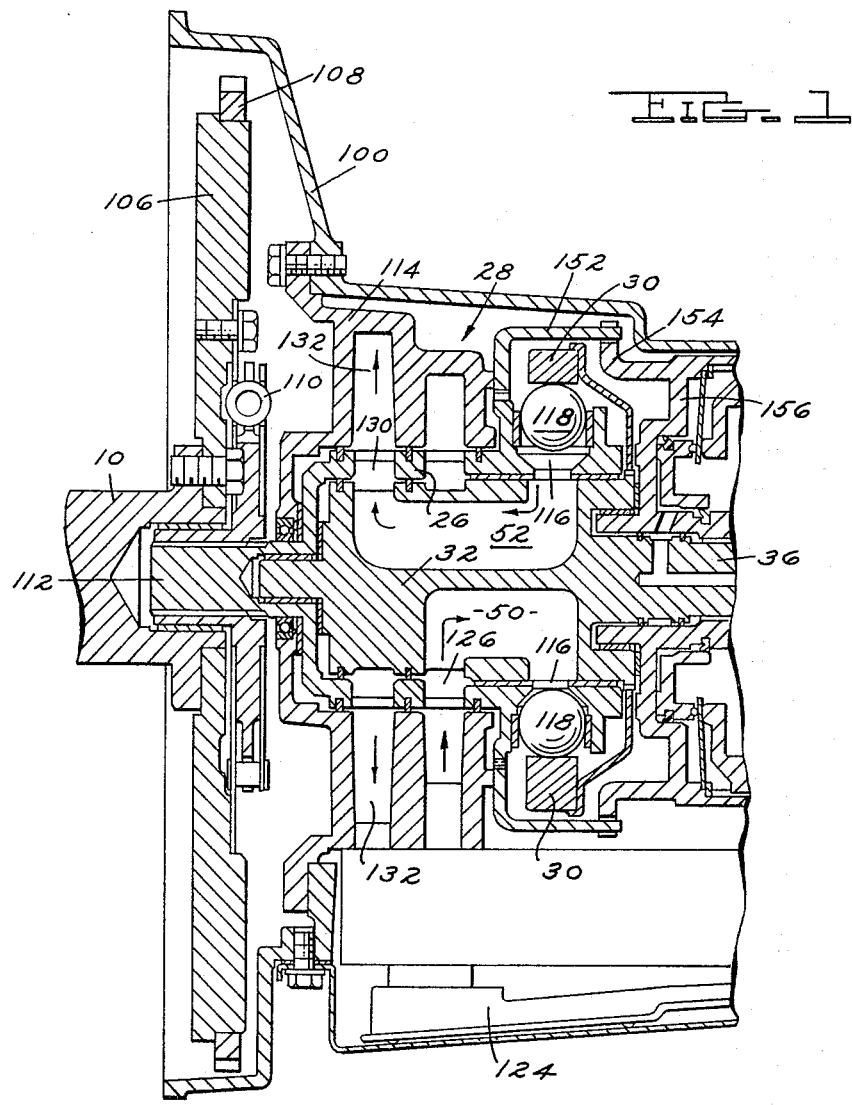

The pump 28 has fluid inlet ports 50 and fluid output ports 52 (FIGURE 1). The discharge from the pump is capable of being blocked or permitted to circulate, by control means shown in FIGURE 3, which will be described later. Fully opening the pump outlet causes normal rotation of the cylinder block 26 without a corresponding rotation of pintle 32 and sun gear 38 by the normal circulation of the output fluid through the system and back to the sump. Completely blocking the pump outlet locks up the pump for rotation of the cylinder block 26 and stroking ring 30 and pintle 32 as a unit, thereby rotating sun gear 38 at engine speed. In either case, the pump always provides a control pressure of a level sufficient to actuate the respective brakes and clutches.

In operation, a neutral condition of the transmission is established by permitting the free circulation of the fluid discharge from the pump, thereby preventing a drive of the stroking assembly 34 and sun gear 38 from the cylinder block 26. With clutch 16 disengaged, no drive is transmitted to either gearset.

First speed forward drive is provided by blocking the fluid outlet from the pump to effect rotation of sun gear 38 at engine speed. Also, the gearset 14 is conditioned for a reduction drive by applying a fluid pressure actuated band 54 to hold ring gear 40 stationary. Forward or clockwise rotation of the input shaft 10 in the direction of arrow 56 therefore rotates sun gear 38 at engine speed causing pinions 42 to walk around within the stationary ring gear 40 and drive output shaft 46 at a reduced forward speed. The control pressure for actuation of the brake is derived from a take-off line from the hydrostatic pump output line, as will be described later in connection with a description of the control system.

Second speed forward reduction drive is established from low speed by subsequently permitting the pump discharge to circulate in a normal manner, and applying clutch 16. The rotation of sun gear 38 is therefore interrupted. Clockwise rotation of input shaft 10 therefore rotates ring gear 18 of gearset 12, causing pinions 22 to walk around the stationary sun gear 20 and drive carrier 24 and output shaft 46 at a reduced forward speed greater than that at which the output shaft was driven during low speed operation.

A direct drive from the input to output shafts is established by subsequently releasing band 54, and again blocking the fluid discharge from the pump so as to rotate both sun and ring gears 38 and 18 at engine speed. Both gearsets are therefore locked up for a unitary drive therethrough.

Reverse drive is established by blocking the output of pump 28 and engaging a reverse brake band 56 to hold ring gear 18 stationary. The remaining band and clutch are released. Clockwise rotation of input shaft 10 then drives sun gear 38 in the same direction at engine speed. Because of the resistance to rotation of output shaft 46, pinions 42 will be rotated in a counterclockwise direction, rotating ring gear 40 and sun gear 20 in the same direction. This causes pinions 22 to be rotated clockwise within the stationary ring gear 18, thereby causing carrier 24 to rotate in a counterclockwise or reverse direction, driving output shaft 46 in the same direction and at a reduction in speed from that of input shaft 10.

Figure 1A:
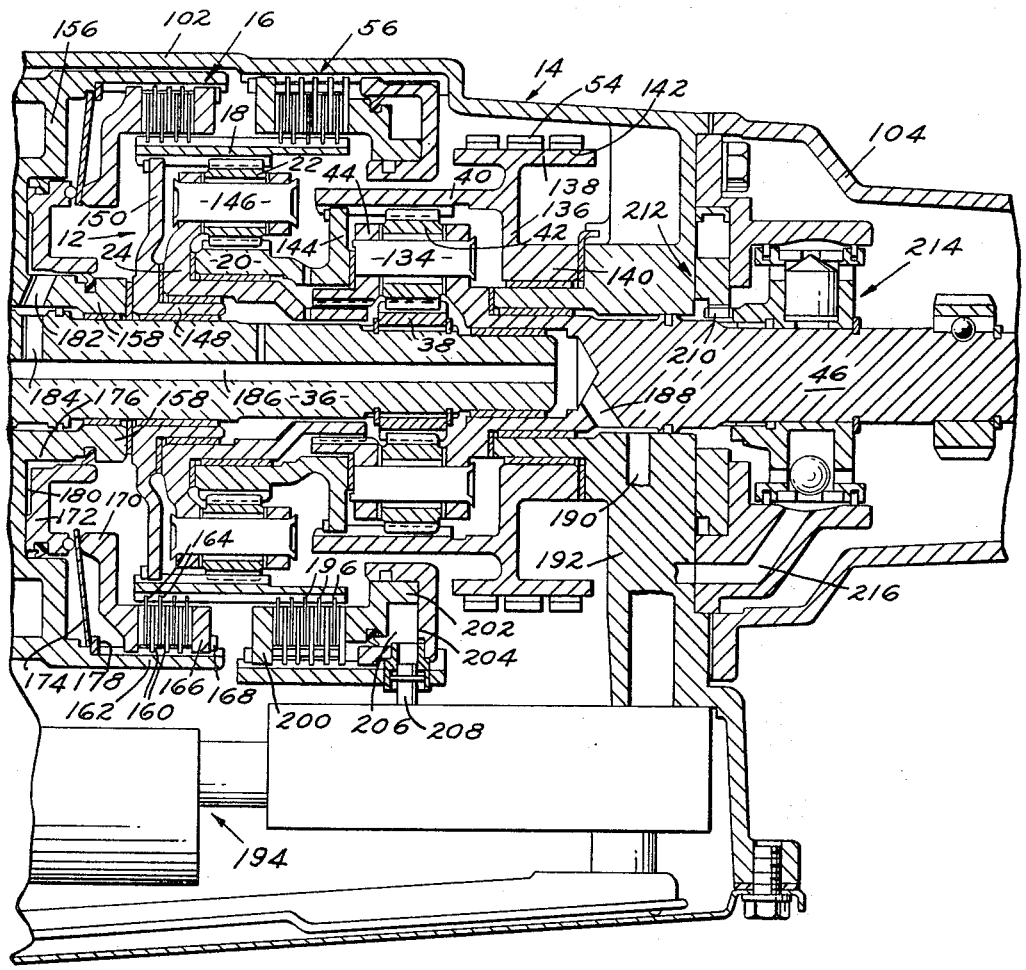

Referring now to the specific details of construction, FIGURES 1 and 1a, which are essentially to scale, show a transmission having a housing consisting of a forward conical section 100, an intermediate substantially cylindrical section 102 and a tapered tailshaft section 104. The open end of the forward section receives the terminal portion of the power input shaft 10, which is adapted to be connected to any suitable source of power, such as the internal combustion engine, not shown, for a motor vehicle. The input shaft has a conventional flywheel 106 and starter gear 108 secured thereto by bolts, as shown, the flywheel 106 being bolted to a known type of vibration damper 110. The damper is internally splined to a shaft 112 formed as an extension of the cylinder block 26 of the hydrostatic ball piston pump 28.

The cylinder block 26 is rotatably and sealingly mounted between a casing 114 secured to the transmission housing section 100, and the pump pintle 32. The pintle lies along the axis of the transmission, and is pivoted at one end in the shaft 112. The cylinder block is formed with a number of circumferentially spaced pumping bores 116 each receiving a number of the radially movable ball piston pumping members 29. The ball piston members are held outwardly by centrifugal force against the stroking ring or cam 30 having an internal surface 120 that is eccentric with respect to the axis of the cylinder block. The stroking ring has an annular radial flange 122 welded thereto and splined to the pintle 32 so that the two constitute a unitary stroking assembly.

The pump unit operates in a known manner. One-half of the ball piston members progressively move radially outwardly upon rotation of the cylinder block 26 to draw fluid from a fluid sump 124 through intake passages 50, 126, and 128 in the pintle 32, cylinder block 26, and pump casing 114, respectively. The other half of the ball pumping members are progressively being forced radially inwardly to force the fluid previously drawn into bores 116 out through discharge passages 52, 130 and 132 in the pintle 32, cylinder block 26, and casing 114. The specific control of the discharge from the pump will be described in more detail later.

As shown, the pintle 32 is formed as part of the intermediate shaft 36 to which is splined the sun gear 38 of the rear gearset 14. This gearset is of the simple three-element planetary type having circumferentially spaced planet pinions 42 meshing with the sun gear and the ring gear 40. The planet pinions are rotatably mounted on pinion shafts 134 secured in the carrier member 44 formed integral with power output shaft 46. The ring gear 40 extends axially to both sides of the gearset, the one side having radial extensions 136 and 138. The portion 136 forms a hub 140 for rotatably supporting the ring gear 40, while portion 138 is formed with an external brake friction surface 142 for cooperation with the fluid pressure actuated brake band 54 of the wrap-around type. The opposite side portion of ring gear 40 has a radial torque transmitting flange 144 splined to the sun gear 20 of the front gearset 12.

Gearset 12, like gearset 14, is of the simple three-element planetary type having circumferentially spaced planet pinions 22 meshing with the sun gear 20 and ring gear 18. The planet pinions are rotatably supported upon pinion shafts 146 secured in carrier member 24 splined to carrier 44. Carrier 24 is rotatably supported on the extended hub 148 of a flange 150 splined to ring gear 18, and rotatably supports the sun gear 20. As also shown, each of the gear elements is rotatably supported and axially located between the other gear elements and transmission casing by suitable journal bearings and/or thrust washers.

As stated in connection with FIGURE 2, the torque from the power input shaft can be split to the gearsets 12 and 14. One path, as has been described, is through the pump 28 to sun gear 38 of gearset 14. The other path is from cylinder block 26 through clutch 16 to ring gear 18 of gearset 12. For this purpose, the cylinder block 26 has splined to it a radially and axially extending drum-like portion 152, which is connected to the outer drum-like portion 154 of the fluid pressure actuated clutch 16. The drum 154 has a central web portion 156 with a hub 158 rotatingly and sealingly supporting the intermediate shaft 36.

The clutch is of a known type having a number of annular driving friction discs 160 slidably splined to the internal portion 162 of drum 154 and interleaved with a number of similar friction discs 164 slidably splined to the external drum-like axial extension of ring gear 18. The clutch includes an annular backing member 166, splined to drum portion 162 and located axially against a snap ring 168, and an actuating member 170 slidable axially on the spline to permit engagement or disengagement of the clutch.

The clutch is engaged by axial movement of an annular piston 172 against a Belleville spring 174. The piston is sealingly and slidably movable in a recess 176 in web portion 156, and engages the inner periphery of the conical spring. The spring is fixed axially at its outer periphery against a snap ring 178. The piston is milled as shown to form a fluid chamber 180 between it and the web into which fluid under pressure is supplied to move the piston. This movement then flattens the spring against the actuating member 170 to engage the clutch. The natural resiliency of the spring returns the piston to a clutch disengaged position upon vent of the fluid in chamber 180, permitting wave springs (not shown) between the clutch discs to separate them.

The clutch apply control pressure for actuating the piston is supplied through suitable connecting bores 182 and 184 in the hub 158, a central bore 186 and connecting bore 188 in the intermediate shaft 36, and a bore 190 in the stationary portion of the transmission housing 192. The bore 190 is connected at its opposite end to the fluid pressure control system indicated as a whole by the blocked portion 194. The control system, as will be described in connection with FIGURE 3, is connected, as shown, to the pump output passages 52.

The drum extension of ring gear 18 also slidably supports a number of annular friction discs 196 forming the rotating portion of the reverse brake assembly 56. The assembly includes stationary annular friction discs 198 externally slidably splined to a portion of the transmission housing 102. The brake discs are confined axially between a backing member 200 splined to the casing, and an annular piston 202 slidably movable in a recess 204 in the housing. Like clutch 16, the brake is engaged by fluid under pressure admitted to the chamber 206 through a line 208 from the control system, and is disengaged upon vent of the fluid pressure in the chamber by a compression spring (not shown) and wave springs between the friction discs.

Before proceeding to a description of FIGURE 3, it should be noted that the output shaft 46 drives the rotor 210 of a fluid pump 212 so as to provide a source of fluid under varying pressure supplemental to that provided by the hydrostatic pump 28, as soon as vehicle motion occurs. As will be described in more detail later, this can be used for push-starts and as a supply source for a fluid pressure centrifugal governor 214, also driven by the output shaft. The governor provides a varying output signal pressure in a line 216 connected to the control system, for automatically shifting the transmission to its different drive ranges with changes in vehicle speed.

FIGURE 3 illustrates the fluid pressure control system in block diagram form. It automatically and selectively controls the engagements of the respective brakes and clutches according to a predetermined schedule to provide the various drives through the transmission.

The hydrostatic pump 28 is illustrated schematically as a reversible type, with its cylinder block 26, stroking ring 30 and pintle 32, the pintle being connected to the fluid sump 124. The pintle has dual intake and discharge lines 50 and 52 both connected to the sump through one-way check valves 218 and 220. A shuttle valve 222 controls the high pressure output to the line depending upon the direction of rotation, i.e., whether the pump is driving or a coast condition exists.

During normal forward driving, clockwise rotation of the cylinder block 26 causes one-half of the ball piston members 28 to move radially outwardly by centrifugal force against the stroking ring 30. This draws fluid from the sump 124 past check valve 218 into line 50 and into the connected intake ports in pintle 32, and therefrom into the ball piston bores 116. Simultaneously, the remaining half of the ball piston members are being forced progressively inwardly by the stroking ring 30 to displace the fluid previously drawn into their bores 116 out through the pintle discharge ports and into the discharge line 52. The seating of check valve 220 at this time prevents exhaust of the fluid to the sump. The fluid pressure line 52 moves the shuttle valve 222 to the left and supplies high pressure fluid to line 224. Continued rotation of the cylinder block provides a continuous supply of high pressure fluid to the main line 224.

This same combined pumping action occurs during a coast condition when the pintle becomes the driver, and the cylinder block the driven part. The intake and discharge ports thus reverse; that is, check valve 218 closes while valve 220 opens, line 52 becoming an intake line from the sump, with line 50 becoming a discharge line. The fluid now discharged through line 50 thus moves shuttle valve 222 to the right to connect lines 50 and 224 and maintain the supply of fluid to the system.

The control system includes a number of control valves and elements, including a pressure reducing valve 226, a throttle pressure valve 228, a combination line pressure regulator and check valve 230, a manually operated drive range selector valve 232, a rear fluid pump 234, a governor 236, a first-to-second speed shift valve 238, a second-to-third speed shift valve 240, and a fluid flow blocking valve 242.

The pressure reducing valve 226 reduces the high pressure fluid in line 224 down to a convenient operating level that is commensurate with the torque capacities of the various clutches and brakes 16, 54 and 56 establishing the different drive conditions. This permits the use of low pressure parts and effects smoother shifts.

The reduced fluid under pressure then passes to the valve 230. The valve 230 is a known type of combination line pressure regulator and check valve. The regulating portion of the valve usually is spring biased to a closed position, and when opened by the attainment of the desired pressure, vents excess fluid to the sump through a line 245. It regulates the pressure level of the fluid in a main line 244 supplied thereto from the pressure reducing valve in accordance with changes in torque demand, as sensed at one end by a throttle valve pressure acting thereon in a line 246.

The regulator valve 230 also includes a check valve element, not shown, in the line 248 to the rear pump 234 to prevent the fluid in line 244 from being exhausted to the sump through the rear pump when this latter pump is inoperative. At the same time, the check valve permits the rear pump to supply the system with operating fluid when the hydrostatic pump 28 is inoperative, such as during a push-start or coasting start of a stalled engine.

The throttle valve 228 provides a metered throttle valve pressure, hereinafter referred to as TV pressure, that varies as a function of the changes in vacuum in the vehicle engine intake manifold. It variably meters mainline fluid pressure from the line 244 to a line 246. The valve is connected to vacuum dashpot 250 of a known spring opening-vacuum closing type. At full vacuum, indicative of a vehicle closed throttle condition, the throttle valve is closed, and no control pressure is supplied to line 246. As the vacuum in the intake manifold progressively changes, for the same or relaxed throttle settings a progressively increasing TV control pressure will be supplied through line 246 to act on the pressure regulating valve 230, as well as the shift valves to be described to control their actions as a function of the engine torque demand. Thus, the mainline pressure in line 244 is changed to provide an engaging pressure for the clutch and brakes corresponding to the torque capacity required.

Valve 232 is a manually operable drive range selector valve movable to the left or right to a plurality of positions, such as Reverse, Neutral, Drive range, and manual Low, as indicated by the corresponding indicia. It selectively establishes the different driving operations of the transmission by connecting mainline pressure in line 244 to the respective clutches and/or brakes. It has (1) a Reverse drive range position supplying mainline pressure directly through line 252 to the servo for the reverse brake 56; (2) a drive Neutral position preventing engaging pressure from being supplied to any of the clutches or brakes; (3) a Drive range position permitting automatic operation by supplying mainline pressure to the shift valves so that they can supply the clutch and brake servos when they shift to change from a low speed to an intermediate speed range, and therefrom to a direct drive; and (4) a manual Low drive range position supplying mainline pressure through line 254 directly to the servo for the low and intermediate brake 54.

The governor 236, as described in connection with FIGURE 1, receives a fluid supply from the rear pump 234 through line 256, and regulates the pressure of this fluid in two stages to provide an output signal pressure in line 258 varying with changes in vehicle speed.

The first-to-second speed and second-to-third speed shift valves 238 and 240, hereinafter referred to as the 1–2 and 2–3 shift valves are spring biased to downshifted positions, and move to upshifted positions under the opposing forces of governor pressure and TV pressure applied to opposite ends of the valves through lines 258 and 260, respectively, to condition the transmission for the different drive ranges.

The pump discharge flow blocking valve 242 controls the operation of the hydrostatic pump unit 28. It is spring biased to the position shown, where it blocks the line 224, causing the pump intake check valve 218 to seat and prevent operation of the pump as such. Check valve 220 had previously seated. The cylinder block 26 and stroking assembly 34 therefore rotate substantially as a unit. It will be understood that a minimum relative rotation of the pump parts is maintained at all times because of the necessary volume of fluid flow past the pressure reducing valve 226 to meet the control pressure requirements of the system. These requirements are low, however, since once the fluid lines are filled, relatively little additional fluid is needed to fill the clutch and brake apply chambers or change pressure levels; therefore, the fluid flow past the reducing valve 226 is maintained small and permits control of the pump as desired.

This flow blocking valve 242 is adapted to be moved to an unblocking position by mainline fluid pressure in a line 264 supplied through the 2–3 shift valve 240 from the 1–2 shift valve 238 when the latter valve moves to its second speed position. This movement then connects line 224 directly to line 244 permitting free circulation of the pump fluid, and therefore operation of the pump as such. The pump cylinder block 26 then rotates in a normal manner without rotating the stroking assembly 34. It should be noted, that, while the valve 242 has been shown as having only two positions, it could have a plurality of orificed openings of different sizes, or a single variable area orifice, so as to permit the variable blocking of the pump discharge so as to effect a progressive or other rotation of sun gear 38 at any number of varying speed ratios.

In operation, assuming the vehicle is at a standstill, the rear pump 234 and governor 236 are inoperative, and the manual valve 232 is in its neutral position. This blocks any flow of fluid from the hydrostatic pump to the servos for the respective clutch 16 and brakes 54 and 56, and, therefore, conditions the transmission for a neutral operation.

To establish Low speed forward drive range, the manual valve is positioned to connect the drive range line 266 with mainline pressure in line 244. The shift valves 238 and 240, and blocker valve 242 are in the positions indicated. Mainline pressure is therefore supplied through line 266a, through the 1–2 and 2–3 shift valves 238 and 240 to the servo for the low and intermediate brake to apply brake band 54. The transmission is thus conditioned for low speed forward reduction drive operation. The blocker valve 242 blocks pump output line 224 causing the pump elements to rotate substantially as a unit. Sun gear 38 is therefore driven substantially at engine speed. Clockwise rotation of input shaft 10 (FIGURE 2) now drives sun gear 38 forwardly, rotating pinions 42 in a counterclockwise direction. The pinions are thus forced to walk around within the stationary ring gear 40 to drive carrier 44 and output shaft 46 in a forward direction at a speed reduced from that of the input shaft.

When the force of the governor pressure in line 258 acting on the 1–2 shift valve 238 overcomes the combined forces of the spring and TV pressure in line 260 acting thereon, the valve shifts to the left. This connects lines 266 and 264 while maintaining the low and intermediate brake 54 engaged by the elongated ports in the 1–2 shift valve. At this time, therefore, the blocker valve 242 is acted upon by mainline pressure in line 264 passing through the 2–3 shift valve, and is moved to connect line 224 to line 244. The hydrostatic pump therefore operates solely as a pump, sun gear 38 at this time remaining substantially stationary, i.e., substantially no torque is being applied to the sun gear.

Simultaneously, the unshifted 1–2 valve 238 supplies the servo for the intermediate and high speed clutch 16 with engaging fluid pressure through a line 268 branched from line 264, so that the forward gearset 12 is now conditioned for a reduction drive. Clockwise rotation of input shaft 10 now drives ring gear 18 in the same direction causing pinions 22 to walk around the stationary sun gear 20 in a clockwise direction. The carrier 24 and output shaft 46 are therefore driven in the same direction and at a speed reduced from that of the input shaft. This speed ratio is greater than that established during low speed operation.

Continued increase in speed of rotation of the output shaft increases the governor pressure in line 258 acting on the 2–3 shift valve. When this pressure reaches a level in excess of the spring force and TV pressure acting on the valve, the valve then moves to its upshifted position. In this position, the valve cuts off the supply of engaging pressure to the servo for the low and intermediate brake 54, and the brake servo is vented to exhaust. Also, the supply of actuating pressure to the blocker valve 242 through line 264 is terminated, permitting this valve to return to the position shown. Line 244 again becomes blocked resulting in a lockup of the pump 28 and rotation of sun gear 38 at the speed of power input shaft 10. The intermediate and high speed clutch 16 remains engaged due to its separate supply through line 268 from the 1–2 shift valve 238.

Thus, the ring gear 16 of gearset 12 and sun gear 38 of gearset 14 are both driven substantially at engine speed. Both gearsets are therefore locked up to provide a direct drive from the power input shaft 10 to the power output shaft 46. It will be clear, of course, that the valve land areas and spring forces acting on the shift valves are such as to provide the progressive movement as described. Delayed upshifts, of course, are caused by increases in the TV pressure in line 260 with increased throttle opening movements of the vehicle accelerator pedal decreasing the vacuum.

Automatic coast downshifts from direct drive to intermediate and low speed drives will occur upon reduction in the vehicle speed. This results in a reduction in the governor pressure acting in line 258 on the shift valves 238 and 240. Thus, the shift valves will progressively downshift to establish the respective drive ranges called for by the speed conditions indicated. TV pressure in line 260 is zero. The 2–3 shift valve will therefore downshift at a predetermined speed, when spring force overcomes governor pressure, to establish intermediate speed drive range. Likeswise, subsequently, at the predetermined speed, the 1–2 shift valve will downshift to establish low speed operation.

Forced throttle downshifts below predetermined maximum vehicle speeds can also be made by moving the engine throttle to a wide open or partially open position. This decreases the intake manifold vacuum, effecting an increase in TV pressure in line 260 acting on the shift valves. If the governor pressure at this time is below the critical vehicle speed value, and less than the combined spring and TV pressure forces, the shift valves will downshift in sequence to establish the different reduction drives. It is to be noted that the areas of the shift valves against which the governor and throttle pressures act will also be calibrated so as to provide a hysteresis effect; i.e., the downshift will occur at different vehicle speeds than the upshifts.

A manually low drive range is established by positioning the selector valve to that position. This connects mainline pressure in line 244 to line 254 leading directly to the servo for the low and intermediate brake 54. Since the pressure blocking valve 242 maintains the hydrostatic pump in a locked up condition, the sun gear 38 will be driven at engine speed. With brake band 54 applied, the transmission will be permanently conditioned for low speed operation. No mainline fluid pressure is supplied to line 266, so that no actuating pressure to clutch 16 is available. Therefore, no upshifts to other drive ranges occur.

A Reverse drive is established by moving the manual valve to that position, which connects line pressure in line 244 to the reverse line 252. This effects engagement of the reverse brake 56 to hold ring gear 18 stationary and condition the transmission for a reverse drive. Blocking valve 242 maintains the pump in a lockup condition thereby causing sun gear 38 to be driven in a clockwise direction at engine speed. Due to the initial resistance to rotation of output shaft 46 and carriers 44 and 24, the planet pinions 42 will rotate in a counterclockwise direction. This drives ring gear 40 and sun gear 20 in the same direction, rotating pinions 22 in a clockwise direction. With ring gear 18 stationary, the pinions 22 are forced to walk around in a counterclockwise or reverse direction, thereby driving the carriers 24 and 44 and output shaft 46 in the same direction and at a speed reduced from that of input shaft 10. The rear pump 234 is inoperative during this drive range. The governor 236 therefore provides no pressure to the shift valves 238 and 240, and no upshift to a different speed range occurs. Push-starts, or coast starts of stalled engines, are obtained by the rear pump supplying the system with fluid under pressure through the regulator valve 230. The respective brake and clutch servos are therefore engaged completing a torque path to crank the engine. The pump 28 will then assume the fluid supply for the control system requirements.

Figure 4:
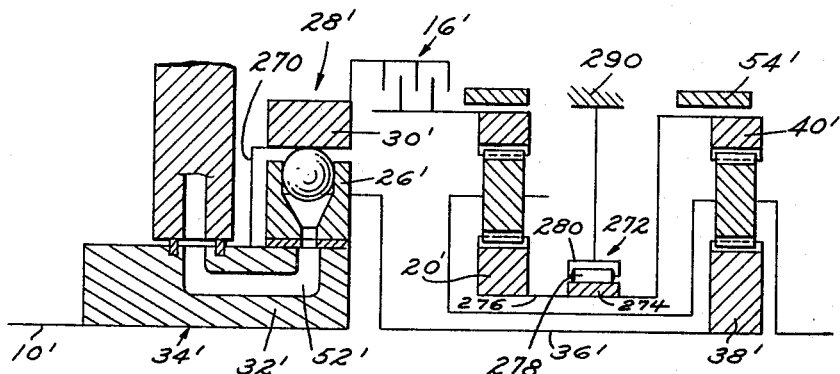

FIGURE 4 shows a modification of the transmission of FIGURES 1–3. This embodiment is changed in only two respects as compared to that of FIGURES 1–3. First, the hydrostatic pump 28 is driven in a slightly different manner, the connections therefrom to the transmission, however, providing the same results. In FIGURE 4, the power input shaft 10' is connected to drive the stroking assembly 34' rather than the cylinder block 26'. The cylinder block 26' is connected directly to the intermediate shaft 36' and sun gear 38'. The pump operates in substantially the same manner as the construction of FIGURES 1–3. Blockage of the pump discharge passage 52' locks up the pump to drive the sun gear 38' at engine speed in the same manner as in the previous embodiment; similarly, unblocking the pump discharge passage terminates the drive to the sun gear 38' while maintaining the control pressure necessary to maintain the respective clutches and brakes engaged. A separate torque path 270 from the input shaft is connected to the input side of clutch 16'.

This figure shows a slightly different arrangement of the gearsets 12 and 14. A one-way or overrunning coupling 272 is coupled to the sun gear 20' and ring gear 40' to provide a pick-up shift between intermediate and high speed drives. Conversely, it provides automatic pick-up shifts between high speed and intermediate speed drives. The coupling consists of an inner annular sleeve race 274 secured to shaft 276 and separated by sprags or rollers 278 from an outer annular race 280. Race 280 is fixed to a stationary portion 290 of the transmission. The coupling operates in a known manner permitting free rotation of the sun and ring gears 20' and 40' and shaft 276 in a clockwise direction, but locks up upon reverse rotational tendency of the sun and ring gears to then hold these gears stationary. Thus, the coupling automatically establishes the low and intermediate speed forward reduction drive ranges without the need for applying a fluid pressure actuated brake member, and automatically releases upon forward rotation of the gear elements to permit establishment of the direct drive range.

The friction band 54' is retained, however, to provide engine braking during a coasting operation of the transmission when the vehicle is in intermediate or low speed drive ranges. In these ranges, the ring and sun gears would normally overrun freely in a forward direction. That is, when the vehicle coasts, output shaft 46 becomes the driving member, causing clockwise rotation of the carriers 44 and 24 at a speed faster than they are being driven by the sun gear 38' or ring gear 18'. This causes the ring and sun gears 40' and 20' to be dragged forwardly, which rotation is permitted by the unlocking of the one-way coupling 272. Engagement of brake band 54', however, will maintain the gearsets conditioned for a reduction drive by holding the sun and ring gears 20' and 40' stationary. The torque therefore follows a completed path from the output shaft 46 through either the sun gear 38' or ring gear 18' and pump 28' to the power input shaft 10'. Engine braking is thus provided by the resistance to faster rotation of the input shaft than it is being driven by the engine.

The control system shown in FIGURE 3 is equally applicable to the FIGURE 4 showing. With the FIGURE 4 construction, it is only necessary in FIGURE 3 to eliminate the branch line 266a leading from the manual valve 232 through the shift valves to the servo for the low and intermediate brake 54. The engagement of this brake is now accomplished automatically by the coupling 272. Also, the hill or engine brake position of the manual valve would be the same as that indicated now by the manual low position of the selector valve. In all other respects, the details of the transmission of FIGURE 4 and its operation are the same as the transmission of FIGURES 1–3.

From the foregoing, it will be seen that the invention provides a three-speed automatic transmission having two reduction drive ranges and a direct drive range controlled by a hydrostatic pump. The pump not only selectively controls which drive range will be established, but also simultaneously provides the control pressure necessary to effect engagement of the respective fluid pressure actuated devices. The pump controls the application of torque to the gearsets, the torque being split into two paths during one condition of operation of the pump, and into a single path during another pump operating condition.

While the invention has been illustrated in its preferred embodiments, it will be clear to those skilled in the arts to which the invention pertains that many changes and modifications may be made thereto without departing from the scope of the invention.

I claim:

1. A transmission having power input and output shafts, and gear means connecting said shafts providing a drive therebetween, said gear means having drive and driven and reaction members and fluid pressure operable devices engageable at times with predetermined ones of said members to condition said gear means for a plurality of drives, means operably connecting said drive and driven members to said input and output shafts respectively, and means in said connections for variably controlling the drive to said drive member, said latter means comprising hydraulic torque transmitting means at all times providing a source of actuating fluid under pressure for rendering operable said devices at said times and having relatively rotatable elements operably connected to said input shaft and said drive member and a fluid outlet capable of being opened or variably blocked to vary the differential speed of rotation between said elements.

2. A transmission having power input and output shafts, and gear means connecting said shafts providing a drive therebetween, said gear means having drive and driven and reaction members and fluid pressure operable devices engageable at times with predetermined ones of said members to condition said gear means for a plurality of drives, means connecting said driven member to said output shaft, and hydrostatic pump means at all times providing a source of actuating fluid under pressure for rendering operable said devices at said times and having relatively rotatable drive and reaction elements operably connected respectively to said input shaft and said drive member and a fluid output variably blocked or opened to vary the differential speed of rotation between said elements to vary the drive to said drive member.

3. A transmission having power input and output shafts, and gear means connecting said shafts providing a drive therebetween, said gear means having a plurality of drive members and driven and reaction members and fluid pressure operable devices engageable at times with predetremined ones of said members to condition said gear means for a plurality of drives, means operably connecting said drive and driven members to said input and output shafts respectively, and means in said connections for variably controlling the drive to said drive members, said latter means comprising hydraulic pump means at all times providing a source of actuating fluid under pressure for rendering operable said devices at said times and having relatively rotatable drive and reaction elements operably connected respectively to both said input shaft and one of said drive members, and to another of said drive members and having a fluid outlet capable of being opened or variably blocked to vary the differential speed of rotation between said elements to vary the drive of said gear means.

4. A transmission having power input and output shafts, and gear means connecting said shafts providing a drive therebetween, said gear means having a plurality of drive members and driven and reaction members and fluid pressure operable means including a clutch means, said fluid pressure operable means being engageable at times with predetermined ones of said members to condition said gear means for a plurality of drives, means operably connecting said drive and driven members to said input and output shafts respectively, and other means in said connections variably controlling the drive to said drive members, said other means comprising hydraulic pump means at all times providing a source of actuating fluid under pressure for rendering operable said clutch means at said times and having relatively rotatable drive and reaction elements operably connected respectively to said input shaft and one of said drive members and a fluid outlet capable of being opened or variably closed to vary the differential speed of rotation between said elements, and intermittently operating means when operable connecting the fluid from said pump to said clutch means to render operable said clutch means and thereby connect said drive element to another of said drive members to provide a different drive through said transmission.

5. A transmission having power input and output shafts, and gear means connecting said shafts providing a drive therebetween, said gear means having a plurality of drive members and driven and reaction members and fluid pressure operable means including a clutch means, said fluid pressure operable means being engageable at times with predetermined ones of said members to condition said gear means for a plurality of drives, means operably connecting said drive and driven members to said input and output shafts respectively, and means in said connections for variably controlling the drive to said drive members, said latter means comprising hydraulic pump means at all times providing a source of actuating fluid under pressure for rendering operable said clutch means at said times and having relatively rotatable drive and reaction elements operably connected respectively to said input shaft and one of said drive members and a fluid outlet capable of being opened or substantially blocked to vary the differential speed of rotation between said elements, and intermittently operating means when operable connecting the fluid from said pump to said clutch means to render operable said clutch means and thereby connect said drive element to another of said drive members to provide different drives through said transmission.

6. A transmission having power input and output shafts, and gear means connecting said shafts providing a drive therebetween, said gear means having a plurality of drive members and driven and reaction members and fluid pressure operable means including a clutch means, said fluid pressure operable means being engageable at times with predetermined ones of said members to condition said gear means for a plurality of drives, means operably connecting said drive and driven members to said input and output shafts respectively, and means in said connections for variably controlling the drive to said drive members, said latter means comprising hydraulic pump means at all times providing a source of actuating fluid under pressure for rendering operable said clutch means at said times and having relatively rotatable drive and reaction elements operably connected respectively to said input shaft and one of said drive members and a fluid outlet capable of being opened or variably blocked to vary the differential speed of rotation between said elements, and intermittently operating means when operable connecting the fluid from said pump to said clutch means to render operable said clutch means and thereby connect said drive element to another of said drive members to provide a different drive through said transmission, said drive being terminated upon opening of the outlet of said pump means and rendering of said intermittently operable means inoperable thereby conditioning said transmission for a neutral condition of operation.

7. A transmission having power input and output shafts, and gear means connecting said shafts providing a drive therebetween, said gear means having a plurality of drive members and driven and reaction members and fluid pressure operable means including a clutch means, said fluid pressure operable means being engageable at times with predetermined ones of said members to condition said gear means for a plurality of drives, means operably connecting said drive and driven members to said input and output shafts respectively, and means in said connections for variably controlling the drive to said drive members, said latter means comprising hydraulic pump means at all times providing a source of actuating fluid under pressure for rendering operable said clutch means at said times and having relatively rotatable drive and reaction elements operably connected respectively to said input shaft and one of said drive members and a fluid outlet capable of being opened or variably closed to vary the differential speed of rotation between said elements, and intermittently operating means when operable connecting the fluid from said pump to said clutch means to render operable said clutch means and thereby connect said drive element to another of said drive members to provide a different drive through said transmission, the substantially closed condition of said outlet rotating said pump means elements substantially as a unit providing one drive range of operation of said transmission, the subsequent operation of said intermittently operating means and engagement of said clutch means providing a second driving range of operation.

8. A transmission having power input and output shafts, and gear means connecting said shafts providing a drive therebetween, said gear means having a plurality of drive members and driven and reaction members and fluid pressure operable means including a clutch means, said fluid pressure operable means being engageable at times with predetermined ones of said members to condition said gear means for a plurality of drives, means operably connecting said drive and driven members to said input and output shafts respectively, and means in said connections for variably controlling the drive to said drive members, said latter means comprising hydraulic pump means at all times providing a source of actuating fluid under pressure for rendering operable said clutch means at said times and having relatively rotatable drive and reaction elements operably connected respectively to said input shaft and one of said drive members and a fluid outlet capable of being opened or variably closed to vary the differential speed of rotation between said elements, and intermittently operating means when operable connecting the fluid from said pump to said clutch means to render operable said clutch means and thereby connect said drive element to another of said drive members to provide a different drive through said transmission, the substantially closed condition of said outlet rotating said pump means elements substantially as a unit providing one drive range of operation of said transmission, the subsequent operation of said intermittently operating means and engagement of said clutch means providing a second driving range of operation, the transmission being conditioned for a third range of operation by substantially unblocking said outlet and rendering operable said intermittently operating means engaging said clutch means thereby providing substantially a direct drive through said gear means.

9. A transmission having a forwardly rotating power input shaft and an output shaft, and means connecting said shafts providing a plurality of drives therebetween, said means comprising a plurality of interconnected planetary gearsets each having drive and driven and other rotatable members and fluid pressure operable devices engageable at times with predetermined ones of said members to condition said gear means for a plurality of drives, releasable brake means for holding members of both of said gearsets against reverse rotation to condition said gearsets for a forward reduction drive, means connecting said driven members to said output shaft, and hydrostatic fluid pump means connecting said input shaft to said gearsets, said pump means at all times providing a source of actuating fluid under pressure for rendering operable said devices at said times and having relatively rotatable drive and reaction elements connected respectively to said input shaft and to one of said drive members and a fluid outlet adapted to be variably opened or closed to control the relative rotation between said elements and thereby vary the drive to said drive member, said devices including a clutch means connecting said drive element to a drive member of another gearset to provide a different drive through said gearsets and intermittently operating means when operable connecting the fluid from said pump to said clutch means to render operable said clutch means.

10. A transmission having a forwardly rotating power input shaft and an output shaft, and means connecting said shafts providing a plurality of drives therebetween, said means comprising a plurality of interconnected planetary gearsets each having drive and driven and other rotatable members and fluid pressure operable devices engageable at times with predetermined ones of said members to condition said gear means for a plurality of drives, overrunning brake means engageable for holding members of both of said gearsets against reverse rotation to condition said gearsets for a forward reduction drive while automatically releasing upon forward rotation of said members, means connecting said driven members to said output shaft, and hydrostatic fluid pump means connecting said input shaft to said gearsets, said pump means at all times providing a source of actuating fluid under pressure for rendering operable said devices at said times and having relatively rotatable drive and reaction elements connected respectively to said input shaft and to one of said drive members and a fluid outlet adapted to be variably opened or closed to control the relative rotation between said elements and thereby vary the drive to said drive member, said devices including a clutch means connecting said drive element to a drive member of another gearset to provide a different drive through said gearsets, and intermittently operating means when operable connecting the fluid from said pump to said clutch means to render it operable.

11. A transmission having a forwardly rotating power input shaft and an output shaft, and means connecting said shafts providing a plurality of drives therebetween, said means comprising first and second planetary gearsets each having sun and ring gears meshed with planet pinions rotatably supported upon a rotatable carrier and fluid pressure operable devices engageable at times with predetermined ones of said gears and shafts to condition said gear means for a plurality of drives, releasable brake means for holding the first gearset sun gear and second gearset ring gear against reverse rotation to condition said gearsets for a forward reduction drive, means connecting said carriers to each other and to said output shaft, and a hydrostatic fluid pump connecting said input shaft to said gearsets, said pump at all times providing a source of actuating fluid under pressure for rendering operable said devices at said times and having relatively rotatable drive and reaction elements connected respectively to said input shaft and said second gearset sun gear and a fluid outlet adapted to be opened or variably blocked to control the relative rotation between said elements and thereby vary the drive to said second gearset sun gear, said devices including clutch means connecting said drive element to said first gearset ring gear to provide a split torque drive to said gearsets, and intermittently operating means when operable connecting the fluid from said pump to said clutch means to render operable said clutch means.

12. A transmission having a forwardly rotating power input shaft and an output shaft, and means connecting said shafts providing a plurality of drives therebetween, said means comprising first and second planetary gearsets each having sun and ring gears meshed with planet pinions rotatably supported upon a rotatable carrier and fluid pressure operable devices engageable at times with predetermined ones of said gears and shafts to condition said gear means for a plurality of drives, releasable brake means for holding the first gearset sun gear and second gearset ring gear against reverse rotation to condition said gearsets for a forward reduction drive, means connecting said carriers to each other and to said output shaft, and a hydrostatic ball piston fluid pump connecting said input shaft to said gearsets, said pump at all times providing a source of actuating fluid under pressure for rendering operable said devices at said times and having relatively rotatable drive and reaction elements connected respectively to said input shaft and said second gearset sun gear and a fluid outlet adapted to be opened or variably blocked to control the relative rotation between said elements and thereby vary the drive to said second gearset sun gear, said devices including clutch means connecting said drive element to said first gearset ring gear to provide a split torque drive to said gearsets.

13. A transmission having a forwardly rotating power input shaft and an output shaft, and means connecting said shafts providing a plurality of drives therebetween, said means comprising first and second planetary gearsets each having sun and ring gears meshed with planet pinions rotatably supported upon a rotatable carrier and fluid pressure operable devices engageable at times with predetermined ones of said shafts and gears to condition said gear means for a plurality of drives, said devices including releasable brake means for holding the first gearset sun gear and second gearset ring gear against reverse rotation to condition said gearsets for a forward reduction drive, means connecting said carriers to each other and to said output shaft, and a hydrostatic fluid pump connecting said input shaft to said gearsets, said pump at all times providing a source of actuating fluid under pressure for rendering operable said devices at said times and having relatively rotatable drive and reaction elements connected respectively to said input shaft and said second gearset sun gear and a fluid outlet adapted to be opened or variably blocked to control the relative rotation between said elements and thereby vary the drive to said second gearset sun gear, said devices including clutch means when operable connecting said drive element to said first gearset ring gear to provide a split torque drive to said gearsets, and selectively operating means connecting fluid from said pump selectively to said brake and clutch means to render them operable selectively, the rendering inoperable of said clutch means and rendering operable of said brake means and substantial blocking of said pump outlet providing one transmission drive range of operation, the subsequent rendering operable of said clutch means and reduced blocking of said pump outlet providing a second drive range of operation.

14. A transmission having a forwardly rotating power input shaft and an output shaft, and means connecting said shafts providing a plurality of drives therebetweeen, said means comprising first and second planetary gearsets each having sun and ring gears meshed with planet pinions rotatably supported upon a rotatable carrier and fluid pressure operable devices engageable at times with predetermined ones of said shafts and gears to condition said gear means for a plurality of drives, releasable one-way brake means for holding the first gearset sun gear and second gearset ring gear against reverse rotation to condition said gearsets for a forward reduction drive while permitting forward rotation thereof, means connecting said carriers to each other and to said output shaft, and a hydrostatic ball piston fluid pump connecting said input shaft to said gearsets, said pump at all times providing a source of actuating fluid under pressure for rendering operable said devices at said times and having relatively rotatable drive and reaction elements connected respectively to said input shaft and said second gearset sun gear and a fluid outlet adapted to be open or variably blocked to control the relative rotation between said elements and thereby vary the drive to said second gearset sun gear, said devices including clutch means connecting said drive element to said first gearset ring gear to provide a split torque drive to said gearsets, and intermittently operating means when operable connecting the fluid from said pump to said clutch means to render it operable, the rendering inoperable of said clutch means and engagement of said one-way brake means and maximum blocking of said pump outlet providing one transmission drive range of operation, the subsequent rendering operable of said clutch means and reduced blocking of said pump outlet providing a second drive range of operation, the maximum blocking of said pump outlet and release of said brake means establishing substantially a split torque direct drive through said gearsets from said input shaft by rotation of said pump elements substantially as a unit.

References Cited by the Examiner
UNITED STATES PATENTS

| | | | |
|---|---|---|---|
| 2,213,616 | 9/1940 | Semon | 192—60 |
| 2,511,518 | 6/1950 | Stephens. | |
| 2,556,666 | 6/1951 | Snyder | 60—54 X |
| 3,159,051 | 12/1964 | Herndon et al. | |

DAVID J. WILLIAMOWSKY, *Primary Examiner.*

D. A. WAITE, *Examiner.*

M. H. FREEMAN, T. C. PERRY, *Assistant Examiners.*